United States Patent [19]

Trovati

[11] Patent Number: 4,497,932

[45] Date of Patent: Feb. 5, 1985

[54] AQUEOUS DISPERSIONS OF POLYURETHANES FROM OLIGO URETHANES HAVING UNSATURATED TERMINAL GROUPS

[75] Inventor: Aldo Trovati, Novara, Italy

[73] Assignee: RESEM, S.p.A., Milan, Italy

[21] Appl. No.: 509,654

[22] Filed: Jun. 30, 1983

[30] Foreign Application Priority Data

Jul. 1, 1982 [IT] Italy .............................. 22178 A/82

[51] Int. Cl.$^3$ .............................................. C08L 75/04
[52] U.S. Cl. .................................... 524/591; 524/839; 524/840
[58] Field of Search .......................... 524/591, 839, 840

[56] References Cited

U.S. PATENT DOCUMENTS 3,472,807 10/1969 Isaacs ................................... 524/839
3,948,837 4/1976 Schmitt et al. ....................... 524/840
4,331,717 5/1982 Wenzel et al. ....................... 524/839

FOREIGN PATENT DOCUMENTS 0000568 2/1979 European Pat. Off. ............ 524/839
0052958 6/1982 European Pat. Off. ............ 524/839
54-134741 10/1979 Japan .................................. 524/839
54-138025 10/1979 Japan .................................. 524/839
1078202 8/1967 United Kingdom ................ 524/839

Primary Examiner—Joseph L. Schofer
Assistant Examiner—N. Sarofim

[57] ABSTRACT

A process for producing stable aqueous dispersions of polyurethanes, which comprises reacting a mixture of a diol containing an ionizable group and a polyol-polyester or polyol-polyether, with an aromatic, or cycloaliphatic or aliphatic isocyanate, to form a prepolymer having terminal isocyanic groups, then reacting this last with a hydroxy-alkyl-(meth)acrylate to obtain an oligourethane having unsaturated terminal groups, and finally dispersing said oligourethane in water and polymerizing it in the presence of radicalic catalysts.

6 Claims, No Drawings

AQUEOUS DISPERSIONS OF POLYURETHANES FROM OLIGO URETHANES HAVING UNSATURATED TERMINAL GROUPS

BACKGROUND OF THE INVENTION

The today known operative processes for producing stable aqueous solutions of polyurethanes are various; in literature there is a large patent and bibliographic documentation, see for instance D. Dieterich, Progress in Organic Coatings, 9, 281 (1981).

Such aqueous dispersions are nearly all of isomeric type, i.e. they contain inside the polyurethanic macromolecule some hydrophile centers of ionic type, which act as internal surfactants and make the polymer dispersable or soluble in water.

The introduction of such ionic centers is carried out by employing particularly diols containing groups which can be salified and which do not react or react with difficulty with the isocyanic groups.

The preparation methods may be of solvent type, that is to say the polyurethane, before its dispersion in water, is obtained in solution of an organic solvent, that is inert towards the free isocyanic groups, such as acetone, methylketone, dioxane, tetrahydrofuran, which, at the end, are removed by distillation.

The amount of organic solvent is generally very high, from 1 to 3 times the weight of the polyurethane, considered as dry, therefore it is obvious that such a process presents some drawbacks, when it is applied on industrial scale, because of the low productivity, the necessity of recycling the solvent, the distillation operations and the long preparation time owing to the low temperature which can be reached.

Methods which allow a sensible reduction in the organic solvent are described in the patent literature: for instance in U.S. Pat. No. 4,183,836 a polyisocyanic polymer containing carboxylic groups as well, is dispersed in an aqueous solution containing a tertiary amine, that acts as salification agent, and a diamine that acts as chain lengthening agent, by acting on the isocyanic terminal groups of the prepolymer, thereby obtaining an anionic polyurethane-polyurea dispersed in water.

In German Pat. No. 2,725,589 a polyisocianic prepolymer containing ionic groups is mixed, under anhydrous conditions, with diamines blocked by ketones (ketonimines) which result to be inert towards the isocyanic groups; the subsequent addition of the water hydrolyzes the ketoniminic groups to aminic group, therefore the free diamine is formed again, that acts as chain lengthening agent.

In European Pat. No. 4069 the lengthening (elongation) of the polyisocyanic prepolymers containing ionic groups is carried out after mixing, under anhydrous conditions, with hydrazines blocked by ketones (ketonhydrazines) and subsequent addition of water.

In U.S. Pat. No. 3,756,992 another preparation method is described, according to which a polyisocyanic prepolymer containing ionic and/or ionizable centers is previously turned into a prepolymer with ureic terminal groups (—NH—CO—NH$_2$) by reaction with urea, by working at high temperature in order to maintain the prepolymer in the method state; after its dispersion in water, on such a prepolymer, methylolic groups are introduced on the ureic terminal groups or also on the NH-groups of the preformed urethanic groups, by means of formaldehyde; by subsequent self-condensation of the formed methylolic groups, polyurethanes with a high molecular weight are obtained.

By using methods based on the water dispersion of ionized and subsequently lengthened (extended) polyisocyanic prepolymers with free or differently blocked diamines and/or hydrazines, essentially linear polyurethanes-polyureas are obtained and such methods can be easily applied by employing polyisocyanic prepolymers based on aliphatic isocyanates; on the contrary, with aromatic prepolymers the high reactivity of the isocyanic groups towards the water as well, involves problems of foaming of the bulk and of formation of coagula, which cannot be dispersed again.

On the other hand, the methods based on the condensation of the ionomeric methylated polyuirethanes, although they allow to obtain reticulated structures and, consequently, films endowed with high resistance towards the solvent, present the drawback to give rise to finished products, which always contain traces of free formaldehyde, with a very sharp stink and, above all, to release to the environment amounts of formaldehyde previously linked as methylolic or methylo-ether group, besides the free one, during the applications steps, which, nearly all of them, foresee a thermic treatment.

THE PRESENT INVENTION

An object of the present invention is a method for obtaining polyurethanic dispersions that can be easily realized indifferently with aromatic, aliphatic or cycloaliphatic organic isocyanates; furthermore, according to said method, no organic solvents or a small quantity thereof should be used during the polyurethane preparation, reticulated macromolecular structures should be obtained, highly irritating and dangerous decomposition products such as formaldehyde should not be released to the environment.

According to the present invention, the polyurethane is obtained through the formation of a polyisocyanic prepolymer by reacting an organic diisocyanate and a mixture consisting of a macroglycol and a diol containing a ionizable group, in such a quantity that the molar ratio between the isocyanic and the sum of the hydroxyl groups of the macroglycol and of the diol ranges between 1.2 and 2.0 preferably 1.5.

It is also possible to introduce triols having a low molecular weight, the quantity of which, however, is critical for the purpose of inducing the formation of prepolymers with viscosity that can be easily treated in the usual apparatuses. Furthermore, for the purpose of inducing the formation of more reticulated macromolecular structures, such small quantities of triols are practically without influence.

The polyisocyanic prepolymer is then turned into oligourethane containing terminal unsaturated functional groups of acrylic and/or methacrylic nature, by reaction with hydroxy-acrylates or hydroxy-alkyl-methacrylates. The amount of such compounds containing at least a hydroxyl group and at least an unsaturated ethylenic grouping depends on the content of isocyanic free groups still present in the polyisocyanic prepolymer, so that the eq-NCO/eq-OH ratio ranges between 0.5 and 1.1, preferably 1.

The formation of the polyisocyanic prepolymer and its subsequent transformation into oligourethane with terminal ethylenic unsaturation can be carried out in the complete absence of organic solvents. The reaction temperature to obtain the various polyisocyanic prepolymers are almost always lower than 100° C., preferably between 50° and 90° C.; the subsequent reactions with the compounds containing at least a hydroxyl group and an ethylenically unsaturated grouping are carried out at temperatures lower than 150° C., preferably between 60° and 120° C.

The reactions can be carried out in the presence of known in the art catalysts such as the tin-organic compounds or the tertiary amines; however that is not generally necessary and it is preferable to carry out the reaction without catalysts.

The essentially linear macroglycols, which can be utilized to form the oligourethane, have a molecular weight ranging between 500 and 5000, preferably between 800 and 3000 and are of the saturated polyester, polyether, polyester-urethane type.

Examples of polyesters are the products of polycondensation of bicarboxylic, preferably aliphatic, acids or anhydrides, having from 4 to 9 carbon atoms with aliphatic diols having from 2 to 8 carbon atoms, alone or in mixture among them, or the polycondendation products on diolic "starters" of the ε-caprolactam.

Examples of polyester-urethanes are the products of polyaddition of the above mentioned polyesters with organic diisocyanates in molar defect.

Examples of polyethers are the various types of polyethylenglycol, polypropylenglycol and, preferably, the polymerization products of tetrahydrofuran.

Examples of polyols with low molecular weight, which may be used in small quantities together with the above mentioned macroglycols are preferably of trifunctional kind, such as the trimethylpropane, the glycerol and the 1,2,6-hexanetriol.

The employable organic diisocyanates may be indifferently of the aromatic, aliphatic or cycloaliphatic type, but the aliphatic or cycloaliphatic ones are preferred, when high resistances against the UV radiation and against the hydrolytic degradation, are desired.

Examples of employable diisocyanates are the 2,4-toluenediisocyanate, alone or in mixture with isomer 2,6-toluenediisocyanate, the 4,4'-diphenyl-methanediisocyanate, the 4,4'-dicyclohexyl-methanediisocyanate, the 1,isocyanate-3,isocyanate-methyl-3,5,5-trimethylcyclohexane (or isophoronediisocyanate), the 2,2,4-trimethylhexamethylenediisocyanate in mixture with isomer 2,6,4-trimethylhexamethylenediisocyanate.

The compounds containing a hydroxyl group, capable of reacting with the isocyanic groups of the prepolymer, and of ethylenically unsaturated group, necessary to turn the polyisocyanic prepolymers into oligourethanes with terminal unsaturation, have the general formula:

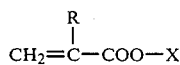

in which R is a hydrogen atom or methyl radical and X is a radical of 2-hydroxyethyl, 2-hydroxypropyl, 3-hydroxypropyl, 4-hydroxybutyl. As ionizable diols, the ones can be employed, which are able to give to the polyurethanic macromolecule a preferably anionic charge, because, in this case, finished products are obtained, which are compatible with auxiliary substances, pigments, dyes and aqueous dispersions of different nature (for instance, acrylic, vinylic, butadieneacrylonitrile etc.), nearly all of them, of anionic nature.

As ionizable diols, the ones can be employed which contain a free carboxylic group, preferably if it is linked with the same carbon atom carrying the two hydroxyl groups, for instance the dimethylolacetic, dimethylolpropionic and dimethylolbutyric acids.

Furthermore also those compounds can be employed, which contain at least two hydroxyl groups and a carboxylic group, that is not linked with the same carbon atom, such for instance the products of semiesterification of triols with bicarboxylic aliphatic anhydrides.

As salification agents of the free carboxylic groups, statistically distributed on the oligourethane chain, use can be made of both inorganic bases such as sodium and ammonium hydroxide, and, preferably tertiary amines or alkanolamines such as triethylamine, dimethylethanolamine, methyl-diethanolamine.

However, according to the present invention, there are not hindrances for obtaining dispersions having cationic character by utilizing as ionizable diols the already known in the art tertiary alkyl-dialkanolamines, such as for instance the methyldiethanolamine, the butyldiethanolamine, the methyldiisopropanolamine and by going successively on the salification of the tertiary nitrogen atom by means of organic and/or inorganic acids, such as hydrochloric, phosphoric, formic, lactic, acetic acids.

The salification of the melted oligourethane, either of potentially anionic or cationic kind, can be carried out by simple addition of the salification agent as such or dissolved in water and/or solvents at temperatures of about 90° C.; should the melted oligourethane have a too high viscosity at such temperatures, a dilution thereof is convenient, before the salification, by means of solvents, which can be preferably mixed with water and have a boiling temperature lower than the one of the water, so that it might be removed by distillation.

The usually necessary amount of solvent does not exceed the fifth of the weight of the oligourethane. The preferred solvents are: acetone, methyl-ethylketone, tetrahydrofuran.

When the salification has been carried out, previous to a possible dilution in organic solvents as above described, the oligourethane can be in any ratio diluted with water. Therefore one proceeds with the water dispersion, in order to have contents of non-volatile substance that are variable according to the content of the ionic groups, generally from 20 to 60% by weight, preferably from 30 to 50% by weight, after having removed by distillation the possible organic solvent, that had been previously employed.

Then the unsaturated oligourethane, dissolved or dispersed in water as above described, can be polymerized, according to known techniques of bulk or semi-batch polymerization. The polymerization is carried out by using generators of free radicals, of organic peroxide or hydroperoxide kind, such as the benzoyl peroxide, the dicumyl peroxide, the ter-butyl-hydroperoxide, the cumene hydroperoxide, the p-methane hydroperoxide or the sodium, potassium, ammonium persulfates, used alone or in couples with reducing agents of sodium metabisulfite and sodium-formaldehyde-sulfoxylate.

The polymerization temperatures can be comprised between 10° and 100° C., depending on the kind of initiator or of the couple initiator-reducing agent, the preferred range of temperature is comprised between 50° and 70° C.

By carrying out the polymerization of oligourethanes containing at least 2 unsaturated terminal groups, reticulated tridimensional macromolecular structures are formed.

If desired, the reticulation degree can be regulated at will, by carrying out the polymerization in the presence of other mono or polyfunctional ethylenically unsaturated monomers. These can be added to the reaction bulk indifferently either during the transformation of the polyisocyanic prepolymer into unsaturated oligourethane or to the aqueous dispersion thereof. In both cases the addition of the comonomers does not present any drawback till to amount of about 40% by weight, calculated on the oligourethane, calculated as dry, owing to the stabilizing action of the present ionic centers, that is comparable to a surfactant action.

Examples of monofunctional ethylenically unsaturated monomers, that can be utilized according to the present invention are: methyl, ethyl, butyl, and so on acrylates and methacrylates; vinylic esters such as the vinyl acetate and propionate; vinylaromatic compounds such as the styrene, the α-methylstyrene, the vinyl-toluene.

Examples of polyfunctional ethylenically unsaturated monomers are: the trimethylpropane-triacrylate and trimethacrylate, the pentacrythrytol triacrylate and trimethacrylate, the 1,6-hexanediol diacrylate, the neopentyl glycol diacrylate and dimethacrylate, the diethylene glycol diacrylate, the tetraethylene glycol diacrylate.

The final aqueous dispersions, obtained according to the present invention, are stable for a long time in complete lack of surfactants and/or colloidal protectors, are practically odourless and consist of polymeric particles with average diameters variable within large limits, depending on the amount of the contained ionic centers, which can be numerically expressed in milliequivalents for 100 g of polymer, considered as dry. These values can vary between 10 and 60 meq/100 g of dry substance, preferably between 20 and 40 meq/100 g of dry substance.

Because of the ionic nature of the polymer, such dispersions are sensitive to the electrolytes.

A possible stabilization thereof can be induced by surfactants and/or colloidal protectors of non-ionic kind, such as ethoxylated derivatives of superior fatty alcohols or alkylphenols. The use of ionic surfactants must, of course, take into account the cationic or anionic nature of such dispersions.

By evaporation of the water they give rise to the forming of films of various hardness, flexibility, elasticity depending on the great variability of utilizable starting materials and on their formulative flexibility, that allows a large possibility of varying the "hard" and "soft segments" of the finished polyurethane.

They can be advantageously employed as aqueous polymeric dispersions in coatings for wood, paper and metal, in the treatment of the textiles, in the finishing of the skins, as adhesives, binders for fibrous materials, dressing for fiber glass.

The following examples are given to illustrate the invention and are not intended to be limiting.

EXAMPLE 1

Into a reactor provided with stirrer, cooler and kept under atmosphere of dry nitrogen, dipped in oil bath with temperature regulation were fed in the following order: 241.87 g of a polyester coming from adipic acid, ethylene glycol and 1,4-butanediol having an average molecular weight of about 1940 at reduced residual acidity (acidity number 0.2 mg KOH/g); 13.4 g dimethylolpropionic acid and 66.56 g of toluenediisocyanate 80/20 (mixture of 80% by weight of isomer 2.4 and 20% of isomer 2.6).

The reaction bulk, after having remained under stirring at 60° C. for about 30 Minutes, was heated to 80° C. and kept at this temperature till the content of free isocyanic groups was about 5.2% by weight.

Then the atmosphere of dry nitrogen was replaced by dry air and 36.54 g of 2,hydroxyethylacrylate were fed all at once. The reaction was carried out at 90° C. till the disappearance of the free isocyanic groups, that was determined by means of IR spectrophotometry. Then one proceeds to the salification of the melted oligourethane by addition of 7.13 g of dimethylethanolamine and subsequently to the dispersion thereof in 548 g of deionized water. One proceeds to the restoration of the nitrogen atmosphere and to the thermostatation of the dispersion at 65° C. In a two hours interval 14.62 g of an aqueous solution of terbutylhydroperoxide at 10% by weight were added in drops and, at the end, the dispersion was kept at 65° C. for a further hour.

The final dispersion had a white milky (lactescent) aspect, a content of solids of 39% by weight and a content of anionic groups of about 27 meq/100 g of dry substance.

By evaporation of the water at room temperature it gives rise to the formation of a transparent, colourless, moderately flexible film, that is insoluble in acetone, dimethylformamide, trichloroethylene.

EXAMPLE 2

According to the same conditions described in example 1, a polyurethanic dispersion was prepared, that was formulated as follows:

| | |
|---|---|
| polyester of example 1 | 251.55 g |
| dimethylolpropionic acid | 13.40 g |
| toluenediisocyanate 80/20 | 60.03 g |
| 2-hydroxypropylacrylate | 29.92 g |
| dimethylethanolamine | 7.13 g |
| ter-butylhydroperoxide (solution at 10% by weight) | 14.48 g |
| deionized water | 543.04 g |

The content of free isocyanic groups of the polyisocyanic prepolymer was 4.1% by weight.

The final dispersion had a content of solids of 39.2% and of anionic groups of about 27.6 meq/100 g of dry substance; its colour was milky (lactescent) and its viscosity low.

The film, obtained by evaporation of the water, is colourless, more flexible than the one of example 1, insoluble in organic solvents.

Such a dispersion, added with the usual thickners, dyes and additives, used in the common acrylic emulsions, can be employed as adhesive layer in the manufacture of imitation leather obtained by the technology called "transfer". The obtained manufacture was characterized by a high adhesion of the polyurethanic layer to the textile support, of agreeable hand softness and high resistance to the solvents and the washings.

EXAMPLE 3

According to the same conditions described in example 1, a polyurethanic dispersion was prepared, that was formulated as follows:

| | |
|---|---|
| polyester of example 1 | 263.16 g |
| dimethylolpropionic acid | 14.74 g |
| hexamethylenediisocyanate | 57.96 g |
| butanediolmonoacrylate | 28.55 g |
| dimethylethanolamine | 7.84 g |
| ter-butylhydroperoxide (solution at 10% by weight) | 14.89 g |
| deionized water | 558.37 g |

The content of free isocyanic groups of the polyisocyanic prepolymer was 3.7% by weight.

The final dispersion had a content of solids of about 39.1% and of anionic groups of about 29.5 meq/100 g of dry substance. The film, obtained by evaporation of the water, was colourless, flexible and insoluble in the organic solvents.

The dispersion can be advantageously employed in the light finishing of quality skins, since it confers high resistance against the various wet and dry abrasion, with an excellent maintenance of the colour tonality even after exposure to the sun and U.V. radiations for a long time.

EXAMPLE 4

According to the same conditions described in example 1, apolyurethanic dispersion was prepared, that was formulated as follows:

| | |
|---|---|
| polyester of example 1 | 263.16 g |
| dimethylolpropionic acid | 14.74 g |
| trimethylhexamethylenediisocyanate | 72.45 g |
| 2-hydroxyethylacrylate | 25.74 g |
| dimethylethanolamine | 7.84 g |
| ter-butylhydroperoxide (solution at 10% by weight) | 15.35 g |
| deionized water | 575.89 g |

The content of free isocyanic groups of the polyisocyanic prepolymer was 3.7% by weight.

The final dispersion had a content of solids of about 39.2% and of anionic groups of 28.6 meq/100 g of solids.

The film obtained by evaporation of the water, was colourless, flexible and insoluble in the organic solvents.

EXAMPLE 5

According to the same conditions described in example 1, a polyurethanic dispersion was prepared, that was formulated as follows:

| | |
|---|---|
| polyester of example 1 | 251.55 g |
| dimethylolpropionic acid | 13.40 g |
| hexamethylenediisocyanate | 57.96 g |
| 2-hydroxypropylmethacrylate | 33.12 g |
| dimethylethanolamine | 7.13 g |
| ter-butylhydroperoxide (solution at 10% by weight) | 14.52 g |
| deionized water | 544.74 g |

The content of free isocyanic groups of the polyisocyanic prepolymer was 4.3% by weight.

The final dispersion had a content of solids of 39.2% and of anionic groups of 27.5 meq/100 g of solids.

The film, obtained by evaporation of the water, was colourless, with good mechanical characteristics and insoluble in the organic solvents.

EXAMPLE 6

According to the same conditions described in example 1, a polyurethanic dispersion was prepared, that was formulated as follows:

| | |
|---|---|
| polyester of example 1 | 251.55 g |
| dimethylolpropionic acid | 13.40 g |
| isophoronediisocyanate | 76.06 g |
| 2-hydroxyethylacrylate | 26.68 g |
| dimethylethanolamine | 7.13 g |
| ter-butylhydroperoxide (solution at 10% by weight) | 15.00 g |
| deionized water | 562.18 g |

The content of free isocyanic groups of the polyisocyanic prepolymer was 4.1% by weight.

The final dispersion had a content of 39.2% of solids and of anionic groups of 26.7 meq/100 g of solids.

The film, obtained by evaporation of the water, was colourless and insoluble in the organic solvents.

The dispersion can be applied, with analogous performances to the ones of Example 3, in the finishing of full bloom of the skins.

What I claim is:

1. A process for producing stable aqueous dispersions of polyurethanes containing in the macromolecule hydrophile ionic groups, as "internal" surfactants, both of anionic and cationic nature, which are present in quantities equal to 10–60 meq/100 g of dry polyurethane, said process consisting of the following operating steps:

(a) a mixture consisting of a diol containing ionizable groups, i.e. groups which can be turned into hydrophile anionic or cationic groups, and of an essentially linear macroglycol, having a molecular weight ranging between 500 and 5000, of at least one of the polyolpolyether and polyol-polyester types, is reacted at a temperature not higher than 100° C., with an excess of a diisocyanate (—NCO/—OH ratio in equivalents between 1.2 and 2), thereby obtaining a prepolymer containing free isocyanic groups;

(b) the polyisocyanic prepolymer is then converted to an oligourethane containing vinylic unsaturated terminal groups, by reaction with a compound containing hydroxyl radicals, which are reactive towards the isocyanic group, and having the general formula:

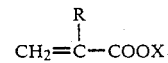

where R is H or $CH_2$, X is a hydroxyalkyl radical;

(c) the obtained oligourethane is subjected to salification treatments in order to convert the ionizable groups into hydrophile cations or anions, respectively of quaternary ammonium kind or of carboxylic, sulphonic, phosphonic group kind;

(d) the oligourethane containing the hydrophile cationic and anionic groups, is subjected to polymerization treatment of the terminal unsaturated groups, in an aqueous dispersion, in the presence of radicalic catalysts at a temperature not higher than 100° C., so as to obtain an aqueous dispersion of polyurethane having a pre-established reticulation degree, that can be regulated by means of a possible addition of comonomers in the polymerization step.

2. A process, according to claim 1, wherein use in made of a diol containing a carboxylic group that is successively salified by a tertiary amine.

3. A process, according to claim 1, wherein use is made of a diol containing a tertiary aminic group, that is successively turned into quaternary ammonic cation by salification.

4. A Process, according to claim 1, wherein the reaction between polyisocyanic prepolymer and hydroxylated unsaturated compound is carried out at a temperature ranging between 80° and 120° C.

5. A process, according to claim 1, wherein the ratio between the —NCO groups of the polyisocyanaic prepolymer and the —OH groups of the hydroxylated unsaturated compounds ranges between 0.5 and 1.1.

6. Aqueous dispersion of a polyurethane having a reticulated structure, provided with hydrophile ionic groups, that are present in amounts equal to 10–60 meq/100 g of polymer, obtained at a concentration from 20 to 60% by weight of dry polymer, according to the process of claim 1.

* * * * *